United States Patent [19]

Iwasaki

[11] Patent Number: 5,095,635
[45] Date of Patent: Mar. 17, 1992

[54] BLOCK FOR FIXING THE COORDINATE AXES OF MATERIAL TO BE PROCESSED BY AN NC WIRE ELECTRO-SPARK PROCESSING MACHINE

[75] Inventor: Satoshi Iwasaki, Tokyo, Japan

[73] Assignee: Japan Automatic Machine Co., Ltd., Tokyo, Japan

[21] Appl. No.: 629,413

[22] Filed: Dec. 18, 1990

Related U.S. Application Data

[63] Continuation-in-part of Ser. No. 337,066, Apr. 12, 1989, abandoned, which is a continuation-in-part of Ser. No. 39,105, Apr. 16, 1987, abandoned.

[30] Foreign Application Priority Data

Apr. 16, 1986 [JP] Japan .................................. 61-56060

[51] Int. Cl.$^5$ .......................... G01B 3/30; G01D 21/00
[52] U.S. Cl. ........................................ 33/644; 33/645; 33/567
[58] Field of Search ................ 33/567, 644, 645, 638, 33/642, 503, 1 M

[56] References Cited

U.S. PATENT DOCUMENTS

| | | | |
|---|---|---|---|
| 86,308 | 1/1869 | Jones | 33/179 |
| 1,407,833 | 2/1922 | Blood | 33/567 |
| 2,601,330 | 6/1952 | Schmidt | 33/642 |
| 2,782,520 | 2/1957 | Amend | 33/642 |
| 2,831,256 | 4/1958 | Werle | 33/567 |
| 4,035,099 | 7/1977 | Friederichs et al. | 33/638 |
| 4,090,240 | 5/1978 | Blanchard | 33/1 M |
| 4,603,391 | 7/1986 | Inoue et al. | 364/474 |

*Primary Examiner*—Thomas B. Will
*Attorney, Agent, or Firm*—Nields & Lemack

[57] ABSTRACT

A block for positioning the wire of an NC wire electro-spark processing machine is simple in shape and easy in handling, with which an original processing point of the NC wire electro-spark processing machine may be easily obtained without cutting or breaking the electrode wire.

1 Claim, 4 Drawing Sheets

FIG_1
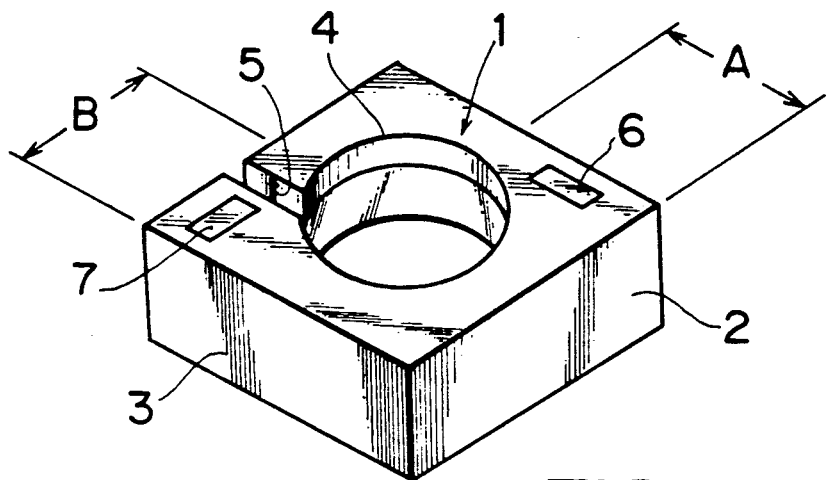
FIG_2
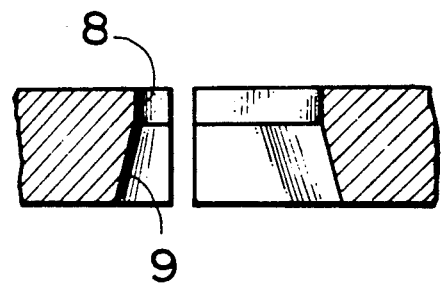
FIG_3
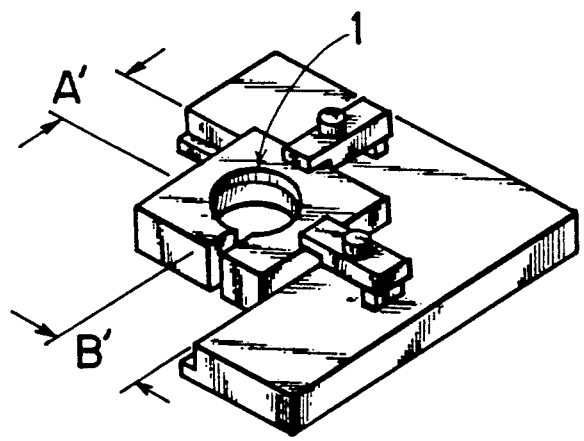

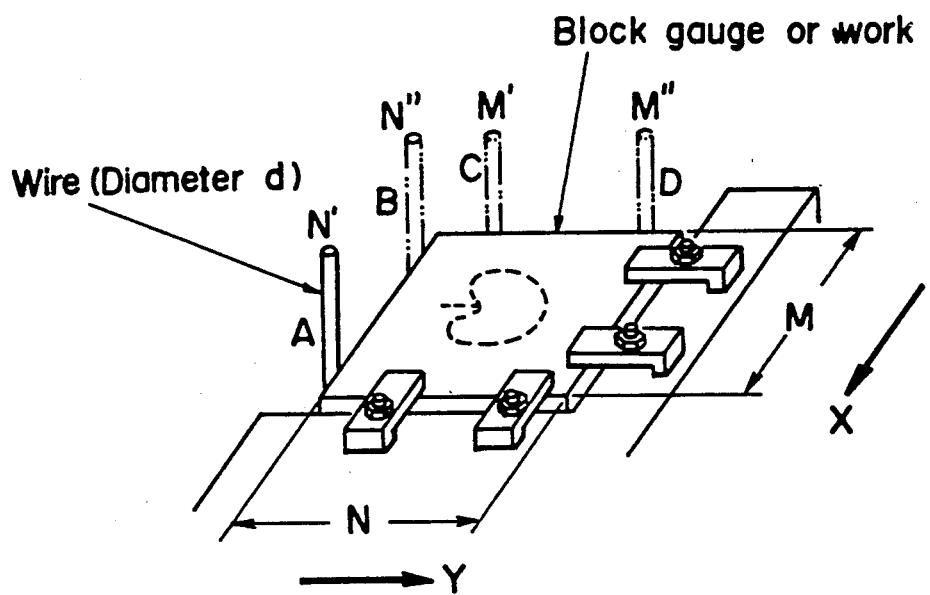
FIG_4
PRIOR ART
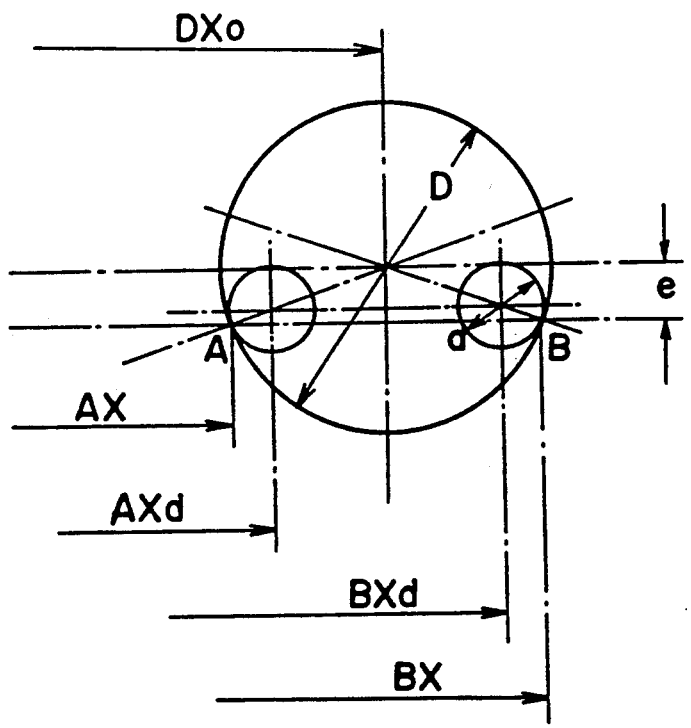
FIG_6

FIG_5
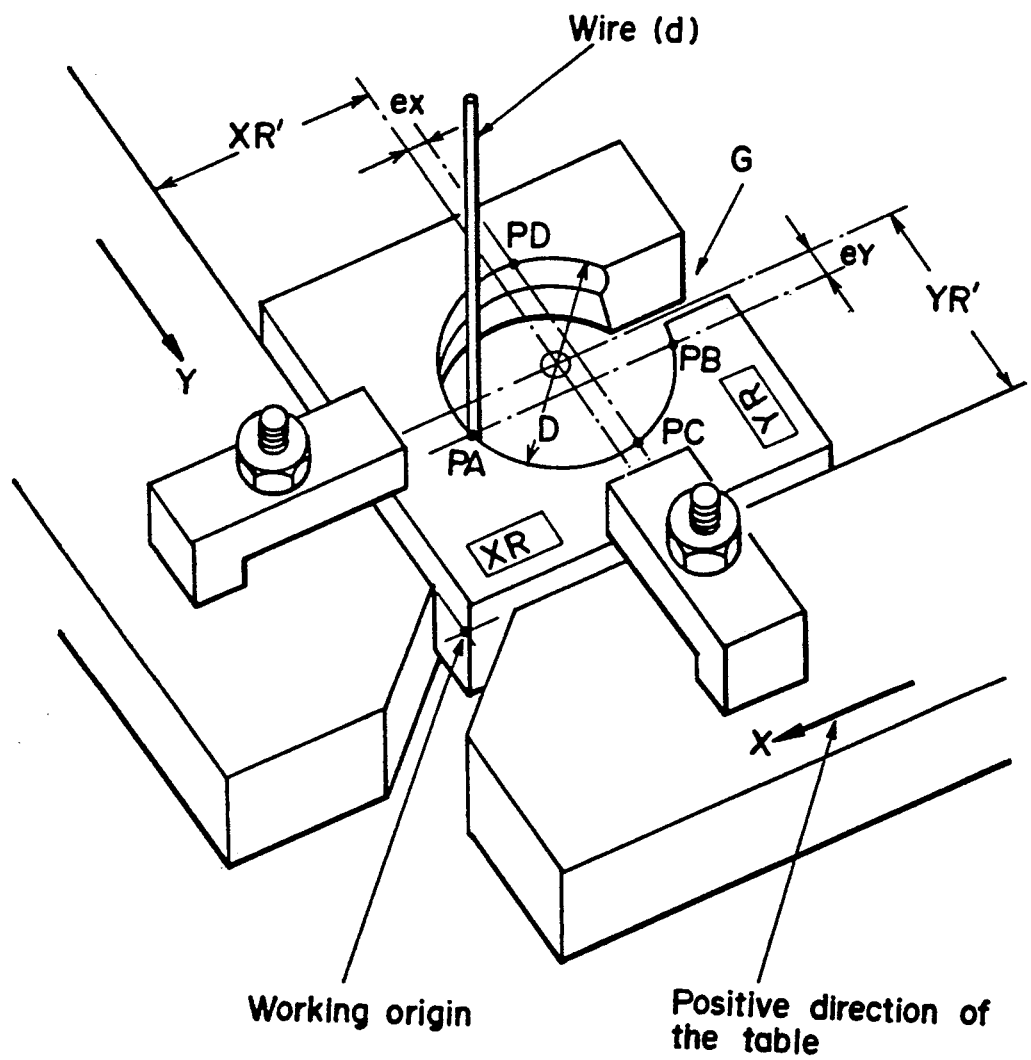

BLOCK FOR FIXING THE COORDINATE AXES OF MATERIAL TO BE PROCESSED BY AN NC WIRE ELECTRO-SPARK PROCESSING MACHINE

This application is a continuation-in-part of application Ser. No. 337,066 filed Apr. 12, 1989, which is a continuation-in-part of application Ser. No. 039,105 filed Apr. 16, 1987 both now abandoned.

INDUSTRIAL APPLICATION FIELD

This invention relates to a block for setting an original processing point of material to be processed by an NC wire electro-spark processing machine.

In electro-spark processing, when discharging is caused between two electrodes, the surfaces of the electrodes are molten and the molten part is blown away by the pressure of the ambient liquid or gas. Such electro-spark or discharge processing applies such an action for carrying out boring, cutting or machining in metals and non-metals.

In "wire electro-spark processing" a discharge is caused between a positive electrode (wire) and a negative electrode (material to be processed) so as to carry out the processing by touching the electrode to the material, and "NC wire electro-spark processing" carries out numerical control of the wire electro-spark process.

Since NC wire electro-spark processing is especially adapted to precise processing, it has been broadly applied to processings of electronic parts, metal parts, lead frame of IC, cameras, spectacles, watches, or centerings of precision machines.

Electric discharge working removes material from a workpiece by causing an electric discharge in a gap between an electrode and a workpiece. Since the work can proceed irrespective of the hardness and the brittleness of the material of the workpiece, it is suitable for processing difficult materials, such as carbide alloys or sintered alloys. Wire electric discharge working is one type of electric discharge working.

This wire electric discharge working method employs a wire-like electrode, feeds the electrode and machines a two-dimensional profile by the "sawing" action of a wire filament as the filament is wound on a take-up reel or spool. This method has the advantage of making it unnecessary to manufacture an electrode of specific shape corresponding to a working object as in die engraving electric discharge working, and may be conducted by forming an NC tape, reading it by an NC controller in a microcomputer, and numerically controlling the drive of X- and Y-axis motors by a signal from the NC controller. Therefore, an advantage of this method is that it can process any complicated shape if it has a profile which can be written by one trace.

In this wire electric discharge process, since it processes by the combination of X-Y coordinates, it is very important accurately to determine in advance the position of the working origin. The usual NC machine tool employs an X-, Y- and Z-axis orthogonal coordinates system having a particular origin for the machine tool. The shape into which a workpiece is to be machined is determined by an X-, Y- and Z-axis orthogonal coordinates system having a particular origin for the workpiece.

Therefore, when the workpiece is processed by the machine tool, it is necessary to bring the coordinates system of the machine tool into coincidence with that of the workpiece. This working is called "the positioning of the working origin".

The invention comprehends a block which enables the operator to ascertain the position of the wire. In other words, the block itself is not used to determine coordinate axes or working origins; it is used to determine the position of the wire in the coordinate system in which the table and the workpiece move. Since the exterior of the block has a rectangular (actually, a square) configuration, it is used in connection with Cartesian coordinates, and the exterior configuration of the block enables it to be positioned so that corner thereof may be placed at the origin of a proposed coordinate system affixed to the work table, with two of the exterior sides of the block extending along the X and Y axis, respectively. The coordinates which the center of the aperture in the block should have are shown on the block itself; these are the Cartesian coordinates of the center of the aperture in the coordinate system wherein the corner of the block is the origin and two of the sides of the block extend along the X and Y axis, respectively. When the machine is first turned on, it has some arbitrary coordinate system with an arbitrary origin. The block enables the operator to read the x,y coordinates (in that arbitrary coordinate system) of the position of the wire when it is in contact with various points on the block, and thereby to calculate the corresponding x,y coordinates of the position of the wire when it is located at the center of the aperture. When the wire is at the center of the aperture, it should have the x,y coordinates printed on the block itself. The operator can then adjust the machine so that, when the wire is at the center of the aperture, it will read out the correct coordinates; in other words, the arbitrary coordinate system and origin of the machine when it is turned on is changed so that the machine has the proposed coordinate system with the desired origin. Nevertheless, the block itself does not change the coordinate system or the origin; the block itself merely determines the position of the wire.

PRIOR ART

For determining the working origin for processing materials to be processed by NC wire electro-spark processing machine, said materials were moved into contact with the electrode wire, or a reference face of a tool for setting said materials was moved into contact with the electrode wire. However, such determination of the working origin required many measurements and were troublesome in the prior art.

SUMMARY OF THE INVENTION

A block for NC wire electro-spark processing machine according to the present invention is defined with a circular hole at determined distances from the respective reference faces of the block for guiding electrode wires, and the positioning of the working origin may be performed easily.

BRIEF DESCRIPTION OF THE DRAWINGS

FIG. 1 is a perspective view of a block for NC wire electro-spark processing machine according to the invention;

FIG. 2 is a cross sectional view, partially in section, of the above;

FIG. 3 is a perspective view of said block provided to NC wire electro-spark processing machine;

FIG. 4 is a diagram in perspective showing the whole view of the apparatus of the prior art;

FIG. 5 is, as FIG. 3, a diagram similar to FIG. 4 showing apparatus using the invention;

FIG. 6 is a diagram showing certain dimensions; and

DETAILED DESCRIPTION OF THE INVENTION

Figure 7:
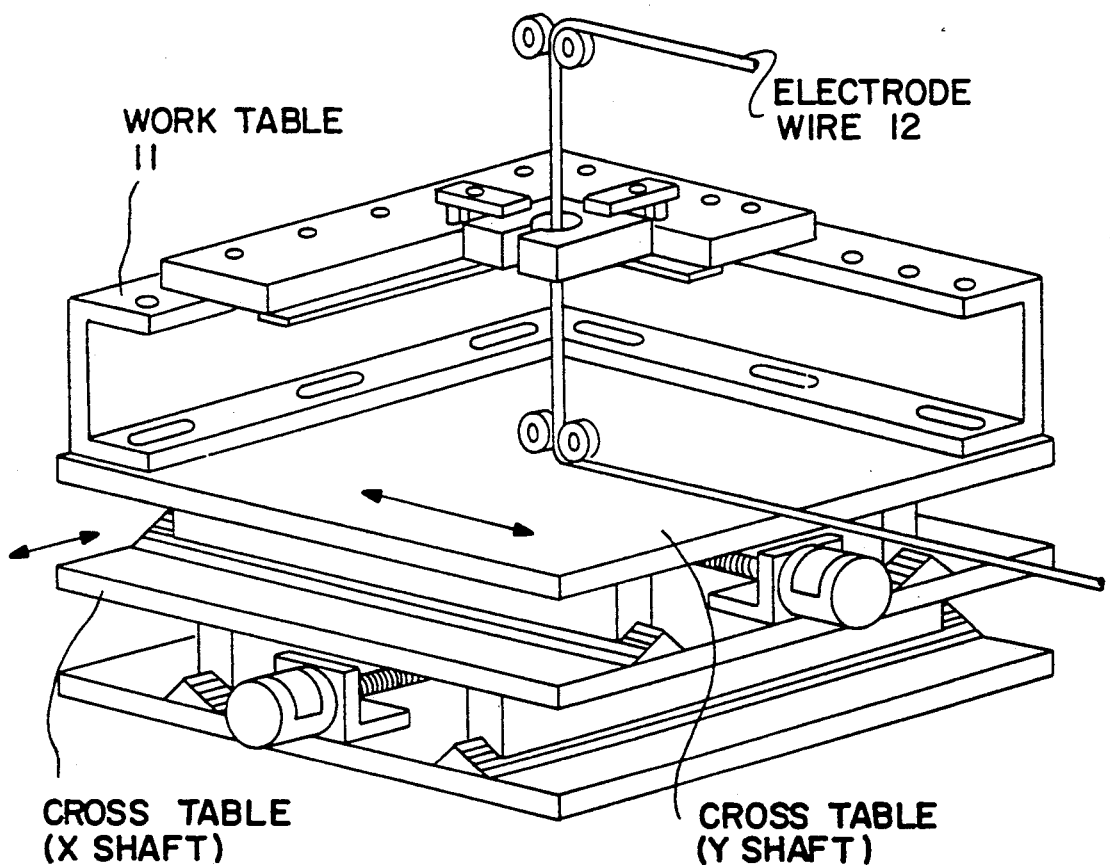
FIG. 7 is a diagram similar to FIG. 5 showing the relationship between the positions of the block, the work table, the electrode wire, and the cross table.

The present invention will be explained with reference to an embodiment shown in the attached drawing.

As shown in FIGS. 1-3 a reference block 1 has reference faces 2 and 3 which traverse each other, and is defined with a circular reference hole 4 which is positioned at a crossing point between a determined distance A from the reference face 2 and a determined distance B from the reference face 3, and said reference hole 4 is formed with a guiding groove 5. The reference block 1 is provided with indicators 6, 7 for showing measured values of said distances A and B at a temperature of 20° C. under 1 atmospheric pressure.

The reference hole 4 is, as seen in FIG. 2, formed with a composite circular hole composed of a cylindrical face 8 and a conical face 9, so that the positioning precision may be improved when determining the positioning of the coordinate of the NC wire electro-spark processing machine.

A typical numerical control electrical discharge machining (NC-EDM) machine is disclosed in U.S. Pat. No. 4,603,391 to Inoue, et al. In such a device a workpiece (as shown at 1 in FIG. 1 thereof) is supported upon an arrangement of drive table (5,8) which are moved in the direction of an X-axis and a Y-axis. Suitable means such as encoders (12,13) provide information as to the movement, along these axes, of the drive tables; such information takes the form of changes in the co-ordinates x and y relative to an arbitrary set of coordinate axes X,Y. The workpiece is "machined" by the cutting action of an electric discharge from a wire (2) as the workpiece is moved. The movement of the workpiece corresponds to some contour (Sc) corresponding to values contained in a computer program of the desired movement (Se) of the axis of the wire. The values of the computer correspond to co-ordinates x and y relative to another arbitrary set of coordinate axes X,Y. In order that the computer program operate properly, if it be assumed that the computer's x',y' values are intended to correspond to the real position of the axis of the wire, then the coordinate axes X',Y' of the machine must conform to the coordinate axes X,Y assumed by the computer program.

This is accomplished by putting the workpiece or a test block on the drive tables and noting the actual coordinate readings x' and y' when the block comes into contact with the wire at various points. The actual coordinate readings may then be adjusted so as to be equal to the values x,y given by the computer program for each such position of the axis of the wire. Such adjustment has the effect of fixing the coordinate axes X',Y' so that they are the same as the coordinate axes X,Y.

The above mentioned reference block 1 is, as shown in FIG. 5, provided to the NC wire electro-spark processing machine, and the electrode wire is guided from the guide groove 5 into the circular reference hole 4 without cutting or breaking the electrode wire, and a table of the NC wire electro-spark processing machine is moved parallel to one axis, which may be designated as a movement along a Y-axis. This may equally well be viewed as a movement of the wire with respect to the table along the Y-axis in the reverse direction. If it be assumed that the coordinate values (as shown by the machine) of the electrode wire when it contacts the inner wall of the cylindrical face 8 are $y_1'$ and $y_2'$, the Y-coordinate $YR'$ of the center of the circular reference hole can be obtained from the relationship $YR'=(y_1'+y_2')/2$, irrespective of the thickness of the wire. The value of $YR'$ is adjusted to be equal to the value of YR shown on the block by utilizing the origin-setting function of the NC wire electro-spark processing machine, whereby the working origin in the Y-axis direction may be set in the machine. Also with respect to movement parallel to an axis orthogonal to said Y-axis, which may be designated as a movement along an X-axis, the value of the X-coordinate $XR'$ of the center of the circular reference hole can be obtained from the relationship $XR'=(x_1'+x_2')/2$, wherein $x_1'$ and $x_2'$ are the coordinate values of the electrode wire contacting on the inner wall of the circular reference hole. The value $XR'$ may be adjusted to be equal to the value XR shown on the block by utilizing the origin setting function of the NC wire electro-spark processing machine. By setting $XR'$ and $YR'$ to be equal to XR and YR respectively, it is possible to set the coordinates so that the coordinates of the corner of the block of FIG. 5 are (0, 0). Thus, the working origin of NC wire electro-spark processing machine may be easily obtained from the reference face without cutting or breaking the electrode wire.

The above mentioned block for positioning for NC wire electro-spark processing machine according to the invention is simple in shape and easy in handling, with which the positioning values of the NC wire electro-spark processing machine may be instantly provided.

Positioning of the working origin according to conventional techniques is shown in FIG. 4. Referring thereto, a block gauge or workpiece the dimensions of which are known in advance is attached to a table, and a wire is sequentially placed at positions shown by symbols A, B, C and D. The average values of the coordinates of these points are calculated, (and the actual values of M and N are set) by proceeding as follows. Actual measured coordinates in the direction of Y-axis of the points A and B: $N'$ and $N''$. Actually measured coordinates in the direction of X-axis of the points C and D: $M'$ and $M''$.

The X and Y coordinates at these works may be obtained with $$\left(\frac{M'+M''-d}{2}, \frac{N'+N''-d}{2}\right)$$

If this is replaced with the previously known M, N, the original processing point is set.

It is apparent that the diameter d of the wire has an effect. In these conventional techniques the positioning was conducted by using a block gauge or a workpiece, but a positioning block having a circular hole in accordance with the invention was not used.

Referring now to FIG. 5, in said FIG. 5:
$e_x$: X-axis eccentric distance
$e_y$: Y-axis eccentric distance
D: diameter of block hole d: diameter of wire
G: penetrating groove The block 1 is fixed to a table 11 of a processing machine, see FIG. 7 and the table 11 and block 1 are moved relative to the wire 12 so that the wire 12 contacts the inner surface of the block 1 from which coordinate values are determined in the following manner.

Normally, the wire is fixed, the table is moved, and the wire is guided to the block hole from the penetrating groove G without cutting the wire. Then, the table is fixed in the Y axial direction, and is moved in the X axial direction, thereby to enable to obtain the X coordinate values XA, XB of PA, PB. Similarly, the table is fixed in the X axial direction, and is moved in the Y axial direction, thereby to enable to obtain the Y coordinate values YC, YD of PC, PD.

The central coordinate of the hole of the block is obtained as $$\left( \frac{XA + XB}{2}, \frac{YC + YD}{2} \right).$$

The values XA, XB, YC and YD are quantities representing distance from an origin, and enable the operator to calculate the x-coordinate (XR') and the y-coordinate (YR') with respect to this origin. However, this origin is an arbitrary one which is created when the electric source is applied to the machine, and hence it is called a "temporary origin". Hence, since this origin cannot be known in advance, the coordinates XR' and YR' with respect thereto are shown in FIG. 5 by lines which do not end at a definite coordinate axis.

Further, the origin-setting function of the machine is used to replace the coordinates (XR', YR') with the reference coordinates (XR, YR), so that the corner working origin of FIG. 5 corresponds to a reading of (0, 0).

That is to say, the measured and known (reference) values are compared and made equal to one another.

Referring now to FIG. 6, in said FIG. 6:

D: diameter of reference hole of this invention d: diameter of wire of wire electrical discharge working machine e: eccentric distance with respect to reference hole at the time of setting the origin in the wire electric discharge working machine.

$$(DXo - AXd) = (BXd - DXo) \quad (1)$$

from this, $$DXo = \frac{Axd + BXd}{2} \quad (2)$$

Therefore, from the expression (2), the center position DXo of the circular hole may be found by reading AXD+BXd and dividing by 2.

What is claimed is:

1. A block for ascertaining the position of an electrode wire of an NC wire electro-spark processing machine in an X-Y plane with respect to a point on the exterior of said block, comprising said block having exterior surfaces including two orthogonal exterior reference faces forming a corner at the junction thereof defining said point and adapted to be received by a frame which supports workpieces for the NC machine, said block having a circular reference hole the center whereof is at a predetermined distance from each of said reference faces, said hole being formed with a composite shape composed of a cylindrical face and a conical face, said block having a groove extending from said hole to an exterior surface of said block, said groove being adapted to allow said electrode wire to pass therethrough into said hole.

* * * * *